United States Patent
Biehler et al.

(10) Patent No.: US 11,117,746 B2
(45) Date of Patent: Sep. 14, 2021

(54) WEAR RESISTANT TRANSFER OR DISTRIBUTION CHUTES

(71) Applicant: PAUL WURTH S.A., Luxembourg (LU)

(72) Inventors: Eric Biehler, Luxembourg (LU); Christian De Gruiter, Fentange (LU); Paul Tockert, Berbourg (LU); Fabien Aldegani, Boulange (FR)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 16/642,237

(22) PCT Filed: Aug. 28, 2018

(86) PCT No.: PCT/EP2018/073065
§ 371 (c)(1),
(2) Date: Feb. 26, 2020

(87) PCT Pub. No.: WO2019/042954
PCT Pub. Date: Mar. 7, 2019

(65) Prior Publication Data
US 2020/0385212 A1   Dec. 10, 2020

(30) Foreign Application Priority Data
Aug. 28, 2017   (LU) ................................ LU 100 378

(51) Int. Cl.
*B65G 11/00*   (2006.01)
*B65G 11/16*   (2006.01)
*B65G 11/02*   (2006.01)

(52) U.S. Cl.
CPC .......... *B65G 11/026* (2013.01); *B65G 11/166* (2013.01); *B65G 2207/48* (2013.01)

(58) Field of Classification Search
None
See application file for complete search history.

(56) References Cited

U.S. PATENT DOCUMENTS 3,607,606 A  * 9/1971  Beninga ................ B02C 17/225
                                                    428/67
4,761,317 A  * 8/1988  Ebata .................. B29C 37/0082
                                                    428/446

(Continued)

FOREIGN PATENT DOCUMENTS

| DE | 2061554 A1 | 7/1971 |
|---|---|---|
| KR | 20130050551 A | 5/2013 |
| WO | 2016011500 A1 | 1/2016 |

OTHER PUBLICATIONS

International Search Report dated Feb. 14, 2019 re: Application No. PCT/EP2018/073065, pp. 1-4, citing: U.S. Pat. No. 6,250,450 B1, US 2010/0218402 A1 and KR 2013 0050551 A1.

(Continued)

*Primary Examiner* — Kavel Singh
(74) *Attorney, Agent, or Firm* — Cantor Colburn LLP

(57) ABSTRACT

A transfer or distribution chute for conveying bulk material by gravity flow includes an elongated chute casing defining a flow path for bulk material and a wear-resistant lining arrangement covering at least part of a flow path facing an upper side of the elongated chute casing. The wear-resistant lining arrangement includes a perforated plate affixed to the chute casing and has a plurality of perforations through which wear-resistant inserts having a body and an enlarged base are fitted in the perforations from a side opposite the flow path, such that their body protrudes through the perforation within the flow path, and their enlarged base abuts the borders of the perforation from the side opposite the flow path on one side and is held in place by the chute casing on the other side.

14 Claims, 1 Drawing Sheet

(56) References Cited

U.S. PATENT DOCUMENTS

| | | | | |
|---|---|---|---|---|
| 4,848,681 | A * | 7/1989 | Eriksson | B02C 17/225 |
| | | | | 241/183 |
| 5,055,336 | A * | 10/1991 | Davis | B65G 11/166 |
| | | | | 428/137 |
| 6,250,450 | B1 | 6/2001 | Howard | |
| 7,837,020 | B2 * | 11/2010 | Pittman | B65G 11/166 |
| | | | | 193/2 R |
| 8,485,336 | B2 * | 7/2013 | Tenold | B65G 11/166 |
| | | | | 193/33 |
| 9,139,366 | B2 * | 9/2015 | Berroth | B65G 19/285 |
| 2010/0218402 | A1 | 9/2010 | Striegel | |

OTHER PUBLICATIONS

Written Opinion dated Feb. 14, 2019 re: Application No. PCT/EP2018/073065, pp. 1-6, citing: U.S. Pat. No. 6,250,450 B1, US 2010/0218402 A1 and KR 2013 0050551 A1.

* cited by examiner

WEAR RESISTANT TRANSFER OR DISTRIBUTION CHUTES

TECHNICAL FIELD

The present disclosure generally relates to wear-resistant chutes for conveying bulk material by gravity flow. Such chutes may be transfer or distribution chutes, in particular distribution chutes for use in harsh conditions such as in shaft or blast furnaces or the like.

BACKGROUND

It is well known within the art of conveying bulk materials that wear resistance is a major concern, especially in case of sharp-edged bulk materials and/or high throughputs. This is particularly true if said materials further impact the chute from a certain height on the entry side, e.g. when fed from an overhead hopper or the like.

Transfer or distribution chutes generally have an elongated casing or body commonly forming a channel through which the bulk materials are conveyed by gravity flow. Their upper entry surface usually defines an impact zone receptive to a flow of bulk material and a sliding zone defining a direction of flow of the bulk material on the chute. The flow path of the chutes usually has a semi-circular, semi-oval, or even closed circular or oval, constant or varying transverse cross section and may be straight or comprise one or more bends as required by the intended application. Transfer chutes are generally stationary and may thus be supported at both ends, or even in-between, while distribution chutes are generally mounted only with their upper end to an appropriate mechanism allowing for its rotating and/or pivoting to direct the flow of bulk material to several locations.

Many solutions have been put forward to propose adequate wear resistance to transfer or distribution chutes, such as special linings made of hard metal or ceramic layers or tiles or even so-called stone-boxes where a layer of bulk material is retained by particular obstructing plates or the like. While all these solutions have their merits, some of these solutions are less or even not at all suitable for applications where the chute is exposed to particularly harsh conditions, such as e.g. in the case of a distribution chute within shaft or blast furnaces.

Indeed, the high temperatures and the corrosive environment within such shaft or blast furnaces ban or render difficult the use of certain materials, such as those not resisting the required temperatures, e.g. most adhesives for composite linings, or even hardened metals losing their hardness in such conditions.

A further problem, be it in near ambient temperature applications or especially in high temperature uses, is the effect of permanent and recurring deformation of the chute casing or body which is particularly detrimental e.g. to composite linings by breaking apart the protective or wear resistance layers.

Finally, a number of the known solutions do not allow for easily repairing the wear-resistant lining in used chutes, even if the damage is only confined to a small region of the entire chute.

U.S. Pat. No. 6,250,450 B1 discloses a liner for an impact surface made of an impact base plate of molded elastomeric material with integrally molded knobs projecting therefrom to accumulate granular material and thereby providing a renewable wear surface, the liner further comprising means for mounting it to the impact surface. While it is clear that this solution is not appropriate for use in high temperature applications, damaged liners have furthermore to be replaced entirely, even if the damage is confined to a small area thereof. Moreover providing liner with different properties for different areas increases the number of assembly/disassembly steps.

DE 2061554 discloses wear protection bodies made of a combination of hard metal carbide or ceramic material and an elastomeric material, wherein the elastomeric material is arranged as a layer between wear protection bodies and the surface to protect in order to serve as a cushion mitigating impact and stroke forces. In some embodiments the wear protection bodies are in the form of spikes partially inserted into the elastomeric layer. While it is clear that this solution is not appropriate for use in high temperature applications, it is to be noted that the insertion blind holes of broken or lost wear protection bodies or spikes are susceptible to be obstructed with transported material thereby rendering the replacement of the spikes difficult, in particular in case of caking or hardening materials WO 2016/011500 A1 discloses a single side access wear plate fastener system, e.g. for use in chutes, comprising: a wear element comprising an aperture (i.e. a blind hole), a fastener configured to be inserted into the aperture of the wear element and also an aperture of a substrate underlying the wear plate, and urging means configured to be inserted, wherein, in use, the urging means exerts a force against a surface of the fastener to urge the fastener to frictionally engage with the wear plate and substrate aperture walls. Both the assembly and the disassembly of the wear element from the wear side (e.g. the flow path side of a chute) are however complex as they require multiples elements and steps of assembly or disassembly for each wear element. It is also to be noted that the apertures of broken or lost wear elements are susceptible to be obstructed with transported material thereby rendering their replacement difficult, in particular in case of caking or hardening materials.

SUMMARY

The present disclosure therefore provides a chute, such as a transfer or distribution chute, which offers good wear resistance, long service life even in harsh conditions, as well as easy and reliable assembly and yet unproblematic repairing.

In order to achieve the above advantage, the present disclosure proposes in a first aspect, a transfer or distribution chute for conveying bulk material by gravity flow, comprising an elongated chute casing defining a flow path for said bulk material, e.g. in the form of a channel. The chute comprises a wear-resistant lining arrangement which covers at least part of the upper side facing the flow path of the elongated chute casing. Said wear-resistant lining arrangement comprises a perforated plate which is affixed to the chute casing and has a plurality of perforations through which wear-resistant inserts are fitted. These inserts comprise a body and an enlarged base and are fitted in the perforations from a side opposite the flow path such that their body protrudes through the perforation within the flow path, while they are held in place by their enlarged base abutting the borders of the perforation from a side opposite the flow path on a first side and (by their enlarged base abutting) the chute casing on a second (opposite) side thereof.

In a second aspect, the disclosure proposes a method for manufacturing a transfer or distribution chute as described herein, the method comprising the steps of (a) preparing a wear-resistant lining arrangement by
  i. providing a perforated plate having a plurality of perforations,
  ii. inserting wear-resistant inserts in each perforation from the side opposite the flow path, such that they are abutting the perforated plate with their enlarged base, preferably with the perforated plate being turned flow-path-side down, (b) assembling the transfer or distribution chute by affixing an elongated chute casing to the wear-resistant lining arrangement by attaching the perforated plate to the elongated chute casing.

The above manufacturing method can of course also be used to refurbish an existing transfer or distribution chute not having a wear-resistant lining or provided with another type or wear protection. In such cases, the existing wear protection is removed (if necessary) from the chute casing before using it in the above method in assembling step (b) with a new wear-resistant lining arrangement prepared in step (a).

In a third aspect, the disclosure proposes a method for repairing a used transfer or distribution chute as described herein, the method comprising the steps of (a) disassembling the used transfer or distribution chute by detaching and removing the elongated chute casing from the wear-resistant lining arrangement by
 i. removing any worn or broken (or if desired all) wear-resistant inserts from the wear-resistant lining assembly,
 ii. inserting new wear-resistant inserts in each empty perforation from the side opposite the flow path, such that they are abutting the perforated plate with their enlarged base, preferably with the perforated plate being turned flow-path-side down, (b) reassembling the transfer or distribution chute by affixing the elongated chute casing to the wear-resistant lining arrangement by attaching the perforated plate to the elongated chute casing.

As can be seen from the above and as further illustrated below, the present disclosure proposes an original way of providing a transfer or distribution chute with a wear-resistant lining with a particularly heavy-duty fastening system for the wear-resistant lining in which the inserts are held in place by catching or clamping their enlarged base between the perforated plate and the chute casing. Said transfer or distribution chute can moreover be easily manufactured and even repaired by replacing only worn-off or broken inserts (i.e. contrary to U.S. Pat. No. 6,250,450 B1) or even all inserts, even in case the chutes had been used for transporting caking or hardening materials (i.e. contrary to DE 2061554 or WO 2016/011500 A1). Moreover, the removed inserts may be replaced by other inserts having different dimensional or wear resistance characteristics, as will be explained in further detail below. Furthermore, it is to be noted that the wear-resistant inserts merely need to be inserted into the perforations of the perforated plate from the side opposite to the flow path (preferably by inserting them while the perforated plate is turned upside-down, i.e. with the flow path side facing downward) and are thereafter secured in place simply and all at once by affixing the perforated plate to the chute casing. Hence, contrary to known solutions, no further steps and no further means of individually securing each of them are required (contrary to e.g. WO 2016/011500 A1). Moreover, as will be appreciated by the skilled person, the present design of the wear resistant lining arrangement held within the chute casing makes it particularly resistant to chute deformations and temperature fluctuations.

The perforations in the perforated plate may have any appropriate shape and size. Preferably, the perforations are round, oval, polygonal, semi-lunar, etc., most preferably they have a round transverse cross section, i.e. a cross section parallel to their base. In general, the inserts have a general transverse cross section, which essentially matches that of the perforation, at least for that part of the insert adjacent to the base. The fit of the insert within the perforation is generally of the clearance type, i.e. leaving enough clearance for the insert to loosely fit, with the enlarged base being dimensioned and shaped to permit abutting to or being stopped by the border or boundary of the perforation (and by the chute casing after assembly of the chute). In certain cases a more tight fit, such as transition or even interference fit might be more appropriate or desired between the boundary of the perforation and the insert.

Hence, the base, which generally has a larger dimension than that of the body of the insert and than that of the perforation, prevents the insert from being able to pass entirely through the perforation. The dimensions of the wear-resistant inserts may be adapted depending of the bulk material. Generally, their dimensions are as follows: diameter from about 20 to about 200 mm, height from about 20 to about 200 mm. For applications such as in a distribution chute for use in a shaft or blast furnace, particularly appropriate dimensions are e.g. from about 40 to about 70 mm, such as about 50 mm for the diameter and from about 40 to about 70 mm, such as about 50 mm for the height. The distance (spacing) between two adjacent perforations or inserts may also be varied, but is generally essentially of similar orders of magnitude than the diameter of the perforations or inserts, preferably the (minimum) free distance between two adjacent perforations or inserts is from about 0.1 to about 10, more preferably from about 0.3 to about 3 times the diameter of the perforation or insert.

As already mentioned above, transfer or distribution chutes generally form a channel having an essentially semi-circular or semi-oval cross section. One advantage of the present disclosure is that the size of the inserts relative to the curvature of the chute is generally such that neither the shape of the base of the inserts, nor that of perforations need to take into account the cross sectional curvature of chute, meaning that flat base and round perforations for round section inserts is sufficient for an appropriate fitting of the base as the chute casing once mounted to the wear-resistant lining arrangement will keep the inserts secured. Of course, if desired or deemed necessary, the shape of the base or of the perforation may be adapted to take into account the cross sectional curvature.

The body of the wear-resistant inserts will generally have an essentially rectangular, tapered or triangular shaped cross section perpendicular to its base. The top of the insert, i.e. the end opposite the insert's base may have any appropriate shape, regular or irregular, flat, concave or convex, etc. Most preferably the inserts have a generally dome or semi-oval shaped cross section perpendicular to its base. The inserts may be hollow or solid, preferably they are solid. They may be made up of essentially one material, of a mix or an alloy of different materials or they may have a composite structure. Depending on the intended use, in particular the nature of the bulk material and the operating temperatures, the material used for the inserts can be chosen e.g. among technical ceramics (alumina ceramics, SiC ceramics, $Si_3N_4$ ceramics, etc.), white cast iron, wear resistant steel, hardfacing material, etc. Of course, these wear-resistant inserts may be manufactured with any appropriate method, such as casting, machining, or material deposition.

Additionally, the present wear-resistant lining arrangement may comprise inserts with different (varying) dimensional and/or wear resistance characteristics along the flow path, e.g. the (protruding) height of the inserts may be reduced at the exit of the chute or progressively decreased along the flow path in order to allow for higher or increasing velocities of the material when leaving the transfer or distribution chute. Alternatively or additionally, the spacing between adjacent inserts and/or the pattern of perforations in the perforated plate and/or the size and shape of the perforations may be varied along the flow path. Alternatively or additionally, the wear resistance and/or material of the inserts may be different depending on the location along the flow path.

Although the pattern formed by the perforations in the perforated plate, and thus of the inserts within the wear-resistant lining arrangement, may be any regular or irregular pattern, the perforations in the perforated plate are preferably arranged in parallel rows, either (all) aligned or off-set (generally two-by-two) relative to each other. In a particularly preferred embodiment, two adjacent parallel rows are off-set relative to each other by half the distance between two centers of adjacent perforations. If the perforations are arranged in parallel rows, they are preferably oriented at an angle from 0 to 90° relative to the flow path, particularly preferably at 90°, i.e. transverse to the flow path and the perforations of adjacent rows are off-set relative to each other. In any case, by appropriately choosing the pattern of the perforations/inserts, their density (numbers of perforations/inserts per surface unit), as well as the dimensions of the inserts, such as their height, diameter (especially their width perpendicularly to the flow path) and shape, the present disclosure allows for obtaining the same effect as in the case of the known stone-boxes, i.e. that a layer of material is retained on the perforated plate between the inserts thereby protecting both the perforated plate and the inserts from the abrasive effect of bulk material. This stone-box effect is of particular interest if the feeding of the transfer or distribution chute is operated with impacting bulk material. In such cases, the pattern, dimensions and number of inserts in the impacting region may be adapted to particularly provide this stone-box effect.

The chute casing and the perforated plate can be made of any appropriate material known to the skilled person depending on the intended use of the chute and/or the location along the flow path of the chute. In particular, they may be made of steel, plates with hard-facing, hard materials, etc.

It is to be noted that, if desired or considered necessary or useful, the transfer or distribution chutes of the present disclosure may comprise the particular wear-resistant lining arrangement described herein only in some regions of the flow path, while one or more other regions within said flow path may be conceived without particular wear protective means or with conventional wear protection systems, such as e.g. regions with conventional stone-box type retaining means and/or regions with a conventional hardfacing lining, etc.

In the context of the present disclosure, the term "about" in relation with a numerical value means that said value is comprised within ±20%, preferably within ±10%, more preferably within ±5% of said value. The terms "diameter" or "height" have their usual meaning. In the case of irregularly shaped objects these terms designate the arithmetical average of said dimensions.

BRIEF DESCRIPTION OF THE DRAWINGS

Preferred embodiments of the disclosure will now be described, by way of example, with reference to the accompanying drawings in which.

Further details and advantages of the present disclosure will be apparent from the following detailed description of several not limiting embodiments with reference to the attached drawings.

DETAILED DESCRIPTION OF THE DRAWINGS

The below detailed description will describe the disclosure more particularly by way of an embodiment of a distribution chute particularly useful in high temperature applications, such as in a shaft or blast furnace. The skilled person will of course readily understand that said description equally or similarly applies to low temperature applications or generally to transfer chutes.

Figure 1:
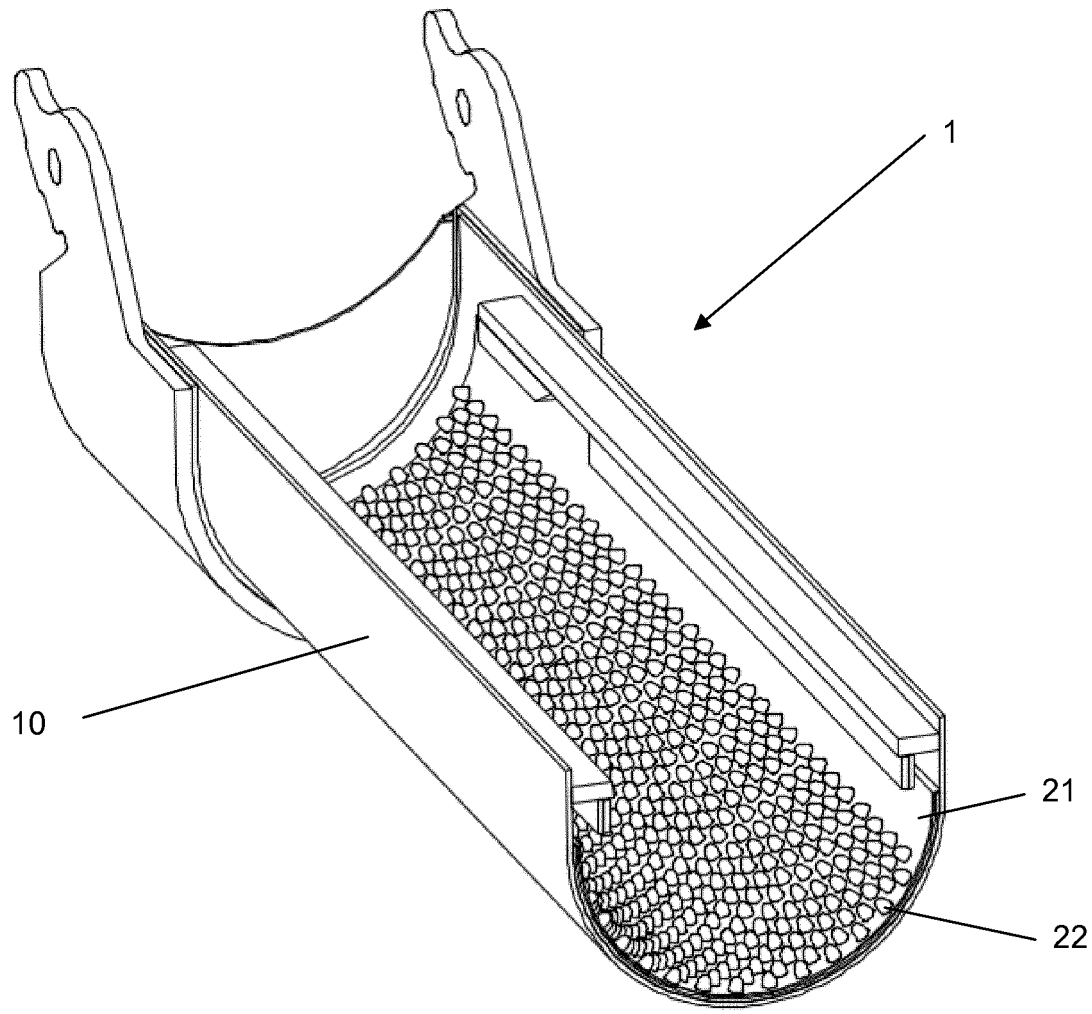
FIG. 1 is a perspective schematic view of (part of) a distribution chute, such as those useable in shaft or blast furnaces.
Figure 2:
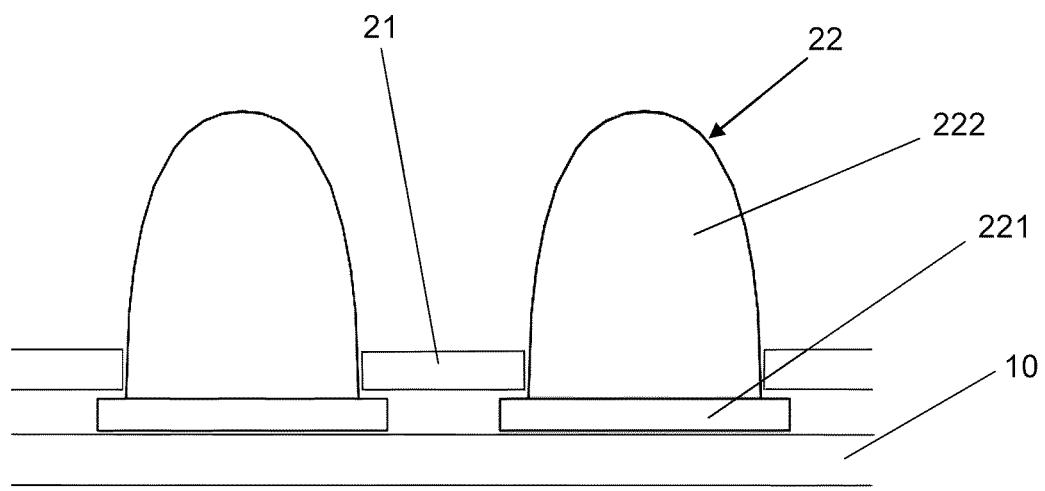
FIG. 2 is a cross sectional schematic view showing a cross section through an example of wear-resistant lining arrangement mounted to a chute casing, basically as shown in FIG. 1.

The present disclosure proposes in a particular aspect, a fastening system for a wear-resistant lining able to withstand high temperatures, such as for a distribution chute 1 located in a blast furnace's top cone. The distribution chute 1 represented in FIG. 1, and as a detail thereof in FIG. 2, has a channel shaped chute casing 10 comprising on its bulk material entry end conventional means for securing the distribution chute to a conventional rotating and pivoting mechanism.

The inside of the channel of the distribution chute is provided with a wear-resistant lining arrangement comprising a perforated plate 21 with a plurality of wear-resistant inserts 22 protruding into the flow path through the perforations. The inserts 22 comprise an enlarged base 221 and a body 222, the body's shape and size being adapted to fit within said perforations while the enlarged base 221 is stopped by the boundaries of the perforation. The fit of the inserts 22 may be relatively loose thereby facilitating their insertion and at the same time compensating for potentially differential temperature expansion rates of the different materials. Hence, during the manufacturing, it may be particularly advantageous to assemble the wear-resistant lining arrangement upside down, meaning with the inserts 22 fitted from the top into the perforations of a perforating plate 21 with its flow channel facing downwards. After having introduced all the inserts 22 in the perforated plate 21, the chute casing 10 may be placed upside down on top on this wear-resistant lining arrangement and affixed thereto by any appropriate means, such as by welding, screws, nuts and bolts, etc. Once the wear-resistant lining arrangement is affixed to the chute casing, the chute may be returned and is ready for use.

The inserts 22 are generally made of wear-resistant materials like for instance, technical ceramics (alumina ceramics, SiC ceramics, $Si_3N_4$ ceramics), with the cast iron, wear resistant steel, hardfacing material, etc. Of course this wear-resistant material may not only be cast, but also be machined. Depending on the expected operating temperatures, the inserts may withstand temperature up to 1100° C. depending on the material chosen: steel and white cast iron: up to 600° C., hardfacing material: up to 800° C., technical ceramic: up to 1100° C. Different material types, grades and sizes can be used in the different areas depending on the solicitation types.

The wear-resistant lining arrangement of the disclosure can be used for the complete chute length or in combination with other linings (stone-boxes, plates with hard-facing, etc.).

The wear-resistant lining arrangement of the disclosure represents a particularly advantageous fastening system for affixing a wear protective lining to a chute casing, which furthermore exhibits an outstanding behavior at high temperatures because it is less sensitive to the chute deformations.

This wear-resistant lining arrangement of the disclosure allows the use of technical ceramics as wear-resistant lining for the distribution chute offering a lower wear rate and a higher admissible working temperature.

The chute casing 10 and the perforated plate 21 can be made of steel, plates with hard-facing, hard materials, etc.

The wear-resistant inserts 22 are placed in between the chute casing and the perforated plate in the way that the insert is held in place due to its larger base.

The inserts 22 are preferably disposed according to a specific pattern in the way that the burden material will be retained in between the ceramic inserts. The pattern can be optimized to guarantee minimum material movement in between the wear resistant inserts and the minimal contact surface with the wear resistant elements. This disposition of the inserts may vary in function of the different areas of strain and wear on the chute, so the spacing between the inserts may be variable, e.g. in the area of impact of the material falling onto the chute, the spacing can be greater in order to retain the material in between the inserts and to allow a stone-box effect. Hence, the design can easily be varied along the chute to adapt to different local requirements, such e.g. enhanced impact vs. enhanced flow behavior, etc.

The dimensions of the wear resistant inserts 22 can be adapted depending of the raw material: Dimension range of the inserts: diameter [20-200 mm]; height [20-200 mm], preferably, the dimensions are about 50 mm for the diameter and about 50 mm for the height.

The combination of different diameters and heights is possible on a same chute, e.g. in the exit part of the chute, the heights of the inserts may be reduced in order to assure higher velocities of the material leaving the chute.

The enlarged base 221 of the wear-resistant insert 22 can be modified for instance to fit the shape of the perforated plate or the base plate.

The inserts 22 may be of different forms: circular, rectangular, polygonal, elliptical, semi-lunar, etc., although the preferred form will be circular.

The invention claimed is:

1. A transfer or distribution chute for conveying bulk material by gravity flow, the transfer or distribution chute comprising:
    an elongated chute casing defining a flow path for said bulk material, and a wear-resistant lining arrangement covering at least part of a flow path facing an upper side of the elongated chute casing, wherein said wear-resistant lining arrangement comprises a perforated plate affixed to the chute casing and having a plurality of perforations disposed in the perforated plate through which wear-resistant inserts comprising a body and an enlarged base are fitted in the perforations from a side opposite the flow path such that their body protrudes through the perforations within the flow path and their enlarged base abuts the borders of the perforations from the side opposite the flow path on one side and their enlarged base is held in place by the chute casing on the other side.

2. The transfer or distribution chute as claimed in claim 1, wherein the perforations in the perforated plate are round, oval, polygonal, or semi-lunar.

3. The transfer or distribution chute as claimed in claim 1, wherein the body of the wear-resistant inserts has a rectangular, tapered, or triangular shaped cross section perpendicular to a base of the body, and a flat, concave, or convex end opposite the base.

4. The transfer or distribution chute as claimed in claim 1, wherein the wear-resistant inserts is made of or comprises technical ceramics, alumina ceramics, SiC ceramics, or $Si_3N_4$ ceramics, white cast iron, wear-resistant steel, or hardfacing material.

5. The transfer or distribution chute as claimed in claim 1, wherein the wear-resistant inserts have an average diameter or height of about 20 to about 200 mm.

6. The transfer or distribution chute as claimed in claim 1, wherein the minimum distance between two adjacent perforations is from about 0.1 to about 10 times the average diameter of the perforation.

7. The transfer or distribution chute as claimed in claim 1, wherein the perforations in the perforated plate are arranged in parallel rows, either aligned or off-set relative to each other.

8. The transfer or distribution chute as claimed in claim 7, wherein the parallel rows are oriented at an angle from 0 to 90° relative to the flow path.

9. The transfer or distribution chute as claimed in claim 7, wherein two adjacent parallel rows are off-set relative to each other by half the distance between the centers of two adjacent perforations.

10. The transfer or distribution chute as claimed in claim 1, wherein the perforations in the perforated plate have different sizes.

11. A method for manufacturing a transfer or distribution chute as claimed in claim 1, the method including the following steps:
    (a) preparing a wear-resistant lining arrangement by
        i. providing a perforated plate having a plurality of perforations, and
        ii. inserting wear-resistant inserts in each perforation from the side opposite the flow path, such that they are abutting the perforated plate with their enlarged base, and
    (b) assembling the transfer or distribution chute by affixing an elongated chute casing to the wear-resistant lining arrangement by attaching the perforated plate to the elongated chute casing.

12. The method as claimed in claim 11, wherein the insertion in step (a).ii is done with the perforated plate being turned flow-path-side down.

13. A method for repairing a transfer or distribution chute as claimed in claim 1, the method including the following steps:
    (a) disassembling the transfer or distribution chute by detaching and removing the elongated chute casing from the wear-resistant lining arrangement by:
        i. removing any worn or broken or all wear-resistant inserts from the wear-resistant lining assembly, and
        ii. inserting new wear-resistant inserts in each empty perforation from the side opposite the flow path, such that they are abutting the perforated plate with their enlarged base, and (b) reassembling the transfer or distribution chute by affixing the elongated chute casing to the wear-resistant lining arrangement by attaching the perforated plate to the elongated chute casing.

14. The method as claimed in claim 13, wherein the insertion in step (a).ii is done with the perforated plate being turned flow-path-side down.

\* \* \* \* \*